DIELECTRIC AMPLIFIER EMPLOYING FERROELECTRIC MATERIALS

Filed Oct. 17, 1952 2 Sheets-Sheet 1

INVENTOR
W. P. MASON
BY N. A. Ewing
ATTORNEY

INVENTOR
W. P. MASON
BY N. S. Ewing
ATTORNEY 2,795,648

DIELECTRIC AMPLIFIER EMPLOYING FERROELECTRIC MATERIALS

Warren P. Mason, West Orange, N. J., assignor to Bell Telephone Laboratories, Incorporated, New York, N. Y., a corporation of New York Application October 17, 1952, Serial No. 315,277

4 Claims. (Cl. 179—1)

This invention relates to signal translating systems and specifically to signal translating systems in which signal amplification is derived from the non-linear stress-charge characteristics of ferroelectric elements.

One of the objects of the invention is to provide a simple, inexpensive and compact signal translating system of the type described and, more particularly, a system adapted to amplify vibrational signals in a wide frequency band such as that occupied by speech waves.

A further object is to provide such a system capable of operation at low frequencies down to and including zero frequency.

An additional object of the invention is to provide a telephone transmitter unit with amplifying properties, utilizing the non-linear characteristics of ferroelectrics.

Ferroelectrics are dielectric materials and generally have a large electrostrictive constant. Mechanical stress applied to such a material produces an electrical charge and it has been observed that the charge so produced is not proportional to the applied stress but is non-linear, as evidenced by the hysteresis loops that are characteristic of ferroelectrics. Barium titanate is an outstanding example of a ferroelectric, for it has a high and widely variable dielectric constant, a low coercive field and a large electrostrictive constant.

If such a ferroelectric be used as a dielectric in a condenser and stress be applied to it, it is found that, due to the electrostrictive properties of the ferroelectric, an electric charge appears on the plates of the condenser and that the capacitance of the condenser changes non-linearly and by large percentages with changes in the magnitude of the applied stress. As a result of this property, the impedance of the condenser to alternating current can be varied widely by relatively small changes in the applied mechanical stress.

In the prototype of the specific embodiments of the present invention, the simultaneous application to such a condenser of a high frequency alternating carrier current and a mechanical stress, or signal, varying at a considerably lower frequency, causes the carrier current to be amplitude-modulated in conformity with the applied signal. The modulated carrier can be demodulated to provide an amplified reproduction of the applied signal.

In accordance with a feature of the present invention, either a single ferroelectric condenser or a pair of ferroelectric condensers is employed in a bridge circuit to which carrier current is applied, and a mechanical signal is applied concurrently to the condenser or pair of condensers to vary the electrical unbalance of the bridge circuit.

In accordance with a further feature of the invention, the aforesaid pair of condensers are arranged in a flexible bimorph or two-ply structure. In a structure of this type, designed and mounted for center flexure motion, mechanical pressure applied against the center of one face of the bimorph flexes the structure and provokes equal electrostrictive response in the two condensers. Additionally, the arrangement constitutes an inexpensive and efficient temperature equalizer for both condensers, and equalization is important in a bridge circuit of the kind described.

A further and more specific feature of the invention is a bimorph comprising a pair of small ferroelectric crystals fixed to opposite faces of a relatively large flexible metallic diaphragm to form a pair of condensers. The diaphragm can serve not only as an intermediate, common condenser plate and mounting structure but also as a means to impart to the ferroelectric plates stresses corresponding to flexure of the diaphragm induced by sound waves or other mechanical signals.

An understanding of the present invention, its various features and objects will appear more fully upon consideration of the accompanying description and drawings.

Figure 1:
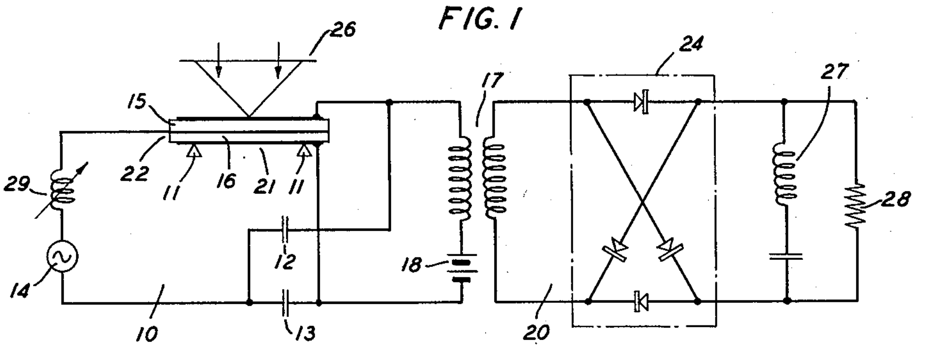
Figs. 1, 2 and 4 are schematic diagrams of alternate forms of a signal amplifier in accordance with the principles of the invention.
Figure 6A:
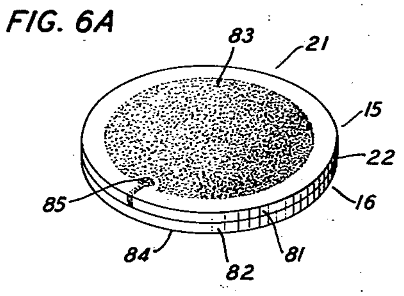
Figs. 6A, 6B and 6C show various bimorph plate arrangements for use in the embodiments of the invention.

Referring particularly to Fig. 1, there is illustrated an amplifier in which the applied stresses, or mechanical signals, are converted into amplified electrical signals through the utilization of non-linear ferroelectric condenser elements. The amplifier comprises, in outline, a modulator 10 and a demodulator 20. The modulator includes a slightly unbalanced capacitance bridge having four arms containing, respectively, condensers 12, 13, 15 and 16. Condensers 15 and 16 have ferroelectric ceramic elements as their dielectrics; they are of equal capacitance when unstressed and no bias voltage is applied thereto, and they constitute a bimorph structure 21 having a common condenser plate, or electrode, 22. A carrier wave source 14 in series with a variable inductance 29 is connected between electrode 22 and the bridge terminal for condensers 12 and 13. The capacitance of each of the latter two condensers are fixed and slightly different from one another. The primary winding of a coupling transformer 17 and a unidirectional biasing voltage source 18, the function of which is described later, are connected in series between the bridge terminal for condensers 12 and 15, and the bridge terminal for condensers 13 and 16. Still referring to the modulator 10, the bimorph structure 21, to be described in further detail hereinafter with reference to Fig. 6A, is mounted for center flexure motion on a supporting structure 11, and a sound cone 26, similar to the type commonly used in loud speakers and exposed to receive sound waves, is connected to the bimorph in such a manner as to cause the bimorph to be flexed in accordance with the motion of the cone.

The demodulator 20 comprises a detector unit 24 having connected thereto on its input side the secondary winding of the coupling transformer 17 and having connected on its output side a tuned inductance-capacitance unit 27 in parallel with an output load which is represented by a resistance element 28.

In this amplifying system a high frequency carrier wave from source 14 in the modulator 10 is applied through the variable inductance 29 to the unbalanced capacitance bridge. As will be described in detail hereinafter, the carrier wave is amplitude modulated in accordance with the stress, or signal, applied to the bimorph condenser unit by means of the sound cone 26, thereby producing in the output of the modulator a carrier wave component and two side band frequencies. These waves as they appear in the primary winding of coupling transformer 17 are induced into its secondary winding which is connected in the demodulator circuit 20. In the demodulator these waves are applied to the detector unit 24 which may be of the type described in United States Patent 2,025,158 of December 24, 1935, to F. A. Cowan, wherein the carrier is utilized to demodulate the side band frequencies and there appears in the output of the demodulator the carrier wave and an amplified reproduction of the signal wave. The carrier frequency is filtered from the output through the tuned resonant circuit 27 and the amplified signal wave appears in the load 28. Except for relatively low power losses occurring in the ferroelectric condensers of the modulator there are no loss elements in the amplifier circuit and the modulator itself is such that the loss introduced therein is so small that the recovered signal, as amplified, has a greater power content than the signal introduced into the circuit.

In order to achieve a low power loss condition in the modulator the impedances of the various circuit elements therein are matched. The equivalent impedance of the capacitance bridge is matched in the input by the impedance of the inductance 29 and the internal impedance of source 14, and in the output by the impedance of the primary winding of transformer 17 and the internal impedance of the voltage source 18. The same plan for matching impedances is carried out in the demodulator wherein the impedances of the circuit input elements and the circuit output elements are made to match the impedance of the detector bridge unit.

Figure 3A:
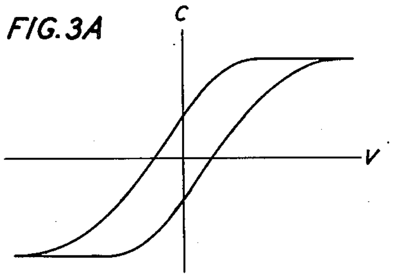
Figs. 3A, 3B, 3C and 3D show certain stress-charge hysteresis loops for barium titanate.

Reference is now made to the mode of operation of the modulator 10. Though the capacitance bridge therein has been described as being unbalanced, for purposes of simplified explanation a balanced bridge will be considered and a later reference will be made to operation with an unbalanced bridge. Assuming the bridge, which comprises the condensers 12, 13, 15 and 16, to be balanced and only the stress from the carrier source 14 to be operative on the condensers of the bridge, each ferroelectric condenser therein exhibits the same hysteresis loop as shown in Fig. 3A where V represents the alternating current voltage from source 14, and C is the resulting charge on each condenser. Inasmuch as the charges produced on condenser 12 and 13 are always equal and in phase, and the charges produced on the condensers 15 and 16 are always equal and in phase, and the equally charged condensers oppose one another in the bridge circuit, there is no resulting current flow through the primary winding of transformer 17.

Figure 3B:
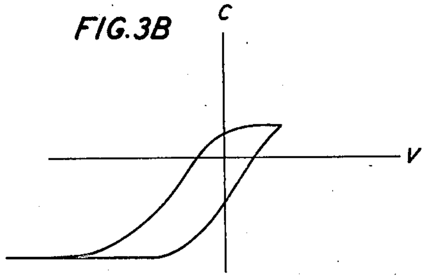
Figure 3C:
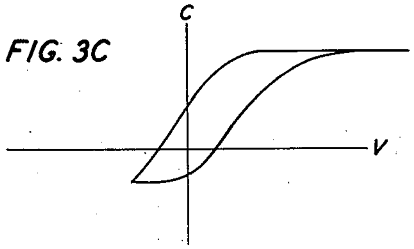

However, when a mechanical stress is applied against the face of the bimorph so as to center flex the bimorph, the condenser dielectrics are stressed equally and oppositely (the one being compressed; the other, stretched) and there are corresponding changes in the electrical charges in the ferroelectric elements and in the capacitance of the condensers. It has been discovered that when the mechanical stress, or signal, is applied simultaneously with the carrier wave to the condensers in the bimorph, the hysteresis loop in each condenser is modified according to the applied mechanical stress. This is evidenced in one ferroelectric condenser, 15 for example, by the fact that one saturation peak of the hysteresis loop is extended by an amount proportional to the mechanical stress and the other saturation peak is cut off by an equal amount, producing a hysteresis loop which is asymmetrically located about the zero position as shown in Fig. 3B. In the other condenser, 16 for example, the hysteresis loop is affected similarly, producing extended and cut off saturation peaks as shown in Fig. 3C. However, in this condenser these respective peaks are oppositely oriented with reference to those of the hysteresis loop of condenser 15. It is apparent then that under these conditions the charges on the condensers 15 and 16 are not equal at all times, that the capacitance bridge becomes unbalanced, and that there is a resulting current flow through the primary winding proportional to the mechanical stress applied.

Figure 3D:
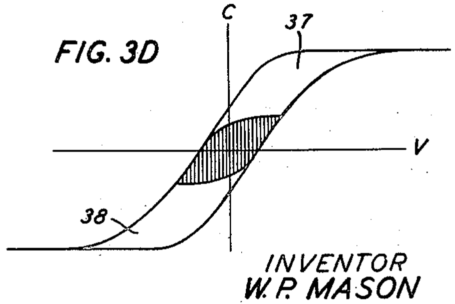

Fig. 3D, which shows the voltage-charge loop of Fig. 3B as superimposed upon that of Fig. 3C, is a graphical indication of the amount of current flow resulting in the primary winding of transformer 17 for a given applied mechanical stress. The unshaded portion 37 shown therein represents the charges that appear on the plates of one of the ferroelectric condensers, 16 for example, which are not opposed by charges on the other ferroelectric condenser, 15 for example, during one half of the voltage-charge cycle. Similarly, the unshaded portion 38 represents the charges that appear on the plates of the condenser 15 which are not opposed by charges on the condenser 16 during the remaining half of the voltage-charge cycle. Inasmuch as the voltage-charge relationship in the condensers is non-linear, amplification conditions are established whereby the output signal is greater than the input signal. It is obvious that if the mechanical stress is varied the current flow will also vary accordingly.

The operation of a modulator having an unbalanced capacitance bridge differs from the foregoing only in that the output of the modulator includes an unmodulated carrier wave component not present in the output of the balanced bridge modulator.

It has been discovered further that the amplifying properties of the modulator are enhanced if a unidirectional biasing voltage 18 is placed in series with the primary winding of transformer 17 and applied across the bimorph 21. Such a voltage affects the saturation peaks of the hysteresis loop in each condenser in a manner similar to that occuring when mechanical stress is applied to the bimorph as previously described with reference to Figs. 3B and 3C. This in turn causes a greater current flow in the output of the modulator and a greater output from the amplifier. A critical value for the biasing voltage is difficult to specify, hence an adjustable biasing source is to be recommended. Best results have been attained in several cases by employing a biasing voltage equal to one fourth of the peak saturation voltage of the ferroelectric element used. Unidirectional biasing of a ferroelectric is qualitatively similar in effect to permanently prepolarizing the ferroelectric.

For high power output a high frequency carrier wave is desirable and the voltage of the carrier wave should be equal in magnitude to the peak saturation voltage of the ferroelectric element used.

Figure 2:
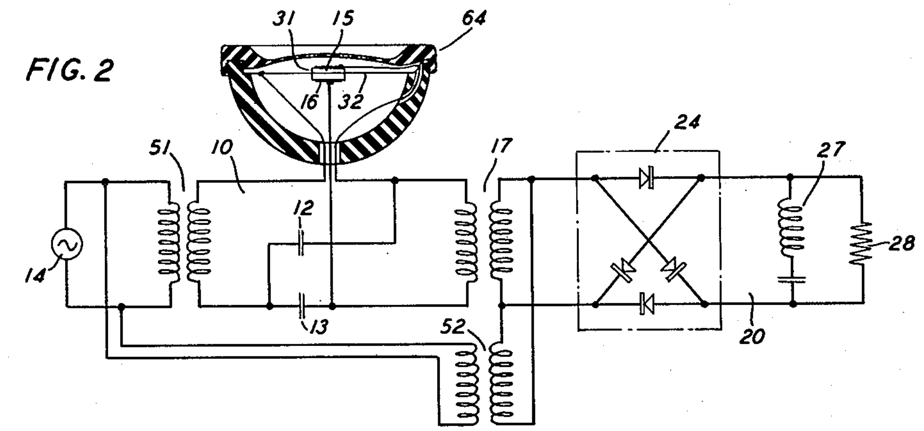

Fig. 2 is a modification of the circuit of Fig. 1 wherein the applied carrier waves are suppressed in the modulator output through the use of a balanced bridge unit and wherein means are provided for reintroducing the carrier waves into the demodulator directly from the carrier source. Additionally, the bimorph unit used in the bridge circuit is composed of two ferroelectric crystals (as distinguished from the ferroelectric ceramic crystalline elements of Fig. 1), which may be of barium titanate or the like. The low voltage saturation peak which is characteristic of a crystal of this type permits better modulation control with peak modulating signals and requires only a low voltage carrier signal.

In this embodiment carrier waves from source 14 are furnished to the modulator 10 through a transformer 51 and to the demodulator 20 through a transformer 52. The modulator 10 comprises a balanced capacity bridge having four arms containing, respectively, condenser 12, 13, 15 and 16, all of equal capacitance. Condensers 15 and 16, each having a ferroelectric crystal as a dielectric, are organized in a bimorph unit 31 with a common condenser plate, or electrode, 33 which is a thin flexible diaphragm of a large diameter. The bimorph will be described in greater detail with reference to Fig. 6B. The bimorph is mounted in an inclosure 64, similar to the type in common use in telephone transmitters, so as to permit diaphragm flexure of the bimorph in response to sound waves directed into the inclosure. Unidirectional voltage source 18, which is included in the modulator of Fig. 1, is omitted in this embodiment.

The demodulator 20 is similar in structure to that of the demodulator in the embodiment of Fig. 1, having as an additional element the secondary winding of the transformer 52 connected in parallel with the secondary winding of transformer 17.

In the embodiment of Fig. 2 the carrier is supplied to the modulator 10 and is modulated in the balanced capacity bridge according to the principles described with reference to Fig. 1 by the sound waves imposed upon the bimorph 31. A signal modulated wave is thereby produced in the coupling transformer 17. This modulated wave, along with the carrier wave, is fed into the detector unit 24. Therein the modulated wave is demodulated and the output of the detector is then a carrier wave and an amplified signal wave, the former of which is filtered from the output and the latter of which appears in resistance element 28, i. e., the useful load.

Figure 4:
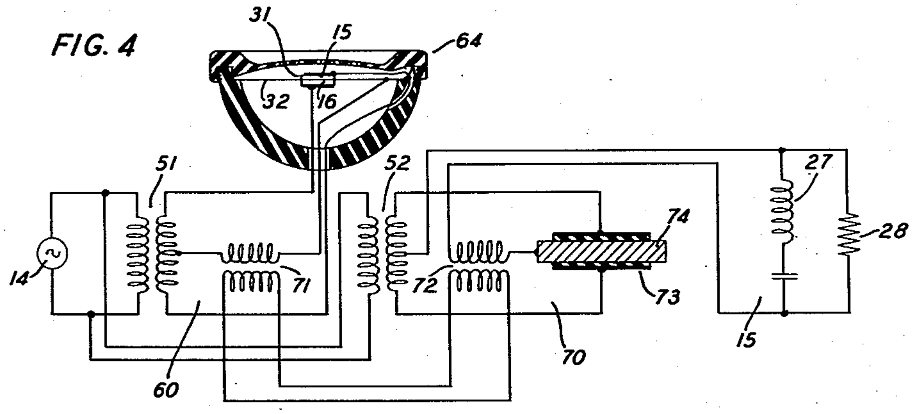

Fig. 4 is a further modification of the invention wherein the carrier and modulation paths are effectively separated in a balanced two-arm capacitance bridge circuit, and wherein the modulator and demodulator both include ferroelectric condenser units. This embodiment comprises a modulator 60, a demodulator 70 and a carrier wave source 14 which supplies carrier waves to the modulator 60 by means of transformer 51 and to the demodulator 70 by means of transformer 52. The modulator comprises a bimorph ferroelectric condenser 31 mounted in an inclosure 64 according to the disclosure of Fig. 2. The secondary winding of the coupling transformer 51 is connected across the condensers 15 and 16 of the bimorph; and the primary winding of transformer 71, in which the signal modulated wave appears, is connected between electrode 32 of the bimorph and the center tap of the divided secondary winding of transformer 51. The secondary winding of transformer 71 is connected to the primary winding of a transformer 72.

The demodulator 70 comprises a non-flexible bimorph ferroelectric condenser unit 73 shown in cross section having a rigid center electrode 74 (as described in detail hereinafter with reference to Fig. 6C), the secondary winding of the transformer 52 connected across the condensers of the bimorph unit 73, and the secondary winding of transformer 72, in series with an output circuit 75, connected between the electrode 74 and the center tap of the divided secondary winding of transformer 52. This output circuit 75 comprises an inductance-capacitance circuit 27 in parallel with the output load here represented by resistance element 28. Any one of the other bimorphs described herein may be substituted for bimorph 73.

The mode of operation of the modulator in this amplifier is similar to that of the others described. In the case of the demodulator 70, the two waves applied may be approximately of equal frequency, but among the products resulting from the intermodulation of the applied waves is an amplified replica of the sound waves and it is this component which is selected for application to the useful load. As in the other embodiments of this invention, both unidirectional and varying signals can be amplified in this embodiment.

Figure 5:
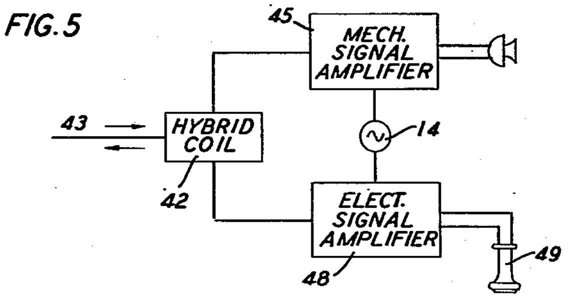
Fig. 5 shows diagrammatically an application of the invention to a telephone subscriber's station.

In Fig. 5 is shown an amplification system in accordance with the invention as it may be applied to a telephone subscriber's station. The transmitting branch of the station, which includes a mechanical signal amplifier 45, and the receiving branch, which includes the electrical signal amplifier 48 and a telephone receiver unit 49, are connected by a signal conductor circuit to the line conductor 43 through a conventional hybrid coil 42. The amplifier 45 may be like any one of those shown in Figs. 1, 2 and 4. The carrier voltage is supplied to the amplifier 45 by source 14 which serves also to supply carrier voltage to the amplifier 48. The latter amplifier may be like either of those shown in Figs. 1 and 2 except for the introduction of the received signals in series with the primary winding of transformer 17, or it may be like that of Fig. 4 except for the introduction of the received signals in series with the primary winding of transformer 71 so that these signals can impart the required varying stress to the ferroelectric condenser unit of the particular circuit. This condenser unit is preferably of the inflexible type illustrated in Fig. 6C.

Figure 6B:
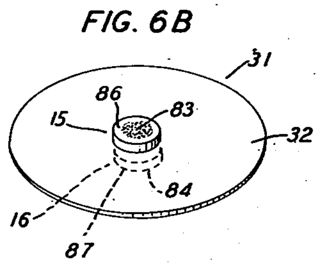
Figure 6C:
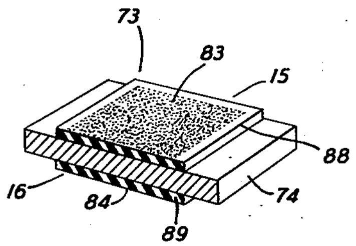

Figs. 6A, 6B and 6C illustrate the bimorph arrangements that are preferred in the various embodiments of this invention. A flexible bimorph ceramic disc arrangement 21, which may be used in both the mechanical and electrical signal amplifiers and comprising condensers 15 and 16, is illustrated in Fig. 6A. Therein the ceramic elements of barium titanate, or the like, 81 and 82 are cemented together with a conductive thermal cement, for example, which constitutes electrode 22, and the entire unit is cured under pressure. Condenser plates 83 and 84 are on the outer faces of discs 81 and 82, respectively, and are, in one example, of aluminum evaporated onto the two surfaces with an uncoated insulating annulus near the circumference of each coated face. A terminal 85 is provided for the inner electrode 22 by a small strip of evaporated metal which is carried from the center electrode 22 over the edge of one of the discs to its outer face and across the insulating annulus to a small area on the face of the disc which is not conductively coated. In this area, and at the end of the strip, silver paste is fired onto the ceramic to provide a soldering area for connecting an electrical conductor to the strip. Suitable silver paste spots may be placed on the faces of condenser plates 83 and 84 to provide suitable areas to which appropriate electric circuit conductors may be soldered.

In Fig. 6B is illustrated a flexible bimorph disc arrangement 31 of condensers 15 and 16 as suggested for use in the circuit of Figs. 2 and 4 wherein the monocrystalline ferroelectric elements, or flakes, 86 and 87 of barium titanate, for example, are attached one on each face of a relatively large flexible, or elastic, diaphragm 32. In practice, the diaphragm may be approximately three inches in diameter and the crystalline flakes .010 to .005 inch thick and .20 inch square. The exposed face of each of the crystals so arranged as at least partially coated with a conductive material to properly constitute condenser plates 83 and 84.

Fig. 6C is a cross sectional view of a non-flexible bimorph arrangement 73 comprising condensers 15 and 16 in which either ferroelectric ceramic or crystal dielectrics may be used. The elements 88 and 89 of such ferroelectric material are cemented, or otherwise affixed, to the block 74 which is characterized as being electrically conductive and having a high thermal conductivity. The exposed faces of the elements 88 and 89 are covered with the condenser plates 83 and 84.

The respective center electrodes of the bimorph units 21, 31 and 73 are made of material having a high thermal conductivity in order to maintain the elements adjacent to each electrode at the same temperature and thereby preserve similar electrical characteristics in each. Additionally, the block 74 of unit 73 is large as compared with the elements attached thereto in order to provide a large surface area for dissipating the heat generated by the elements connected thereto. The surface area can be augmented by adding radiating fins to the block or to the elements, and still further heat control can be had by providing for water cooling of the entire block or the elements.

Although the present invention has been described largely in terms of specific embodiments, it will be understood that these are in part illustrative and that various other embodiments within the spirit and scope of the invention will be evident to those skilled on the art.

What is claimed is:

1. A mechanical signal amplifier comprising a carrier wave source, a modulator and a demodulator connected in circuit relation, said modulator comprising a flexible bimorph ferroelectric condenser unit, a bridge circuit including the two condenser elements of said bimorph unit in respective arms thereof, means for applying a carrier wave from said source to said bridge circuit, means to flex said bimorph condenser unit in conformity with a mechanical signal to be amplified whereby signal modulated carrier waves are produced, said demodulator connected to receive carrier waves from said source and signal modulated carrier waves from said modulator and produce an output which is an amplified replica of the mechanical signal.

2. A mechanical signal amplifier according to claim 1 wherein said bimorph ferroelectric condenser unit comprises a pair of thin, flexible, ferroelectric elements, a first thin, flexible condenser plate having said elements centered on respective faces thereof, a second thin, flexible condenser plate centered on the exposed face of one of said elements and a third thin, flexible condenser plate centered on the exposed face of the other of said elements.

3. A mechanical signal amplifier according to claim 1 wherein said ferroelectric condenser unit comprises a pair of relatively small, thin, ferroelectric crystals, a first thin, flexible condenser plate of relatively large diameter having said crystals centered on the respective faces thereof, a second thin, flexible condenser plate centered on the exposed face of one of said elements and a third thin, flexible condenser plate centered on the exposed face of the other said elements.

4. A signal amplification system comprising a mechanical signal means for producing an amplified replica of an impressed mechanical signal, said means comprising a carrier wave source, a first modulator comprising a flexible bimorph ferroelectric condenser unit, a first bridge circuit including the two condenser elements of said flexible bimorph unit, means to apply carrier waves to said first bridge circuit from said source, means to impress a mechanical signal on said flexible bimorph whereby mechanical signal modulated carrier waves are produced and means to demodulate the mechanical signal modulated carrier waves whereby an amplified replica of the impressed mechanical signal is produced, an electrical signal means for producing an amplified replica of an impressed electrical signal, said means comprising a carrier wave source, a second modulator comprising a non-flexible bimorph ferroelectric condenser unit, a second bridge circuit including the two condenser elements of said non-flexible bimorph unit, means to apply carrier waves to said second bridge circuit from said source, means to impress an electrical signal on said non-flexible bimorph unit whereby electrical signal modulated carrier waves are produced, means to demodulate the electrical signal modulated carrier waves and an output means for the demodulated waves, and a circuit means connecting said mechanical signal means and said electrical signal means whereby the amplified replica of the impressed mechanical signal from the mechanical signal means and the impressed electrical signal to the electrical signal means are carried in a single conductor element.

References Cited in the file of this patent

UNITED STATES PATENTS

| | | |
|---|---|---|
| 1,860,529 | Cady | May 31, 1932 |
| 2,183,708 | Cummings et al. | Dec. 19, 1939 |
| 2,191,315 | Guanella | Feb. 20, 1940 |
| 2,242,757 | Romanow | May 20, 1941 |
| 2,470,893 | Hepp | May 24, 1949 |
| 2,484,636 | Mason | Oct. 11, 1949 |
| 2,526,207 | Donley et al. | Oct. 17, 1950 |
| 2,532,060 | Dicke | Nov. 28, 1950 |
| 2,611,039 | Hepp | Sept. 16, 1952 |
| 2,616,989 | Hepp | Nov. 4, 1952 |

FOREIGN PATENTS

| | | |
|---|---|---|
| 980,661 | France | Dec. 27, 1950 |